US011457342B2

(12) United States Patent
Zielinski et al.

(10) Patent No.: US 11,457,342 B2
(45) Date of Patent: Sep. 27, 2022

(54) VEHICLE, NETWORK ENTITY, APPARATUSES, METHODS, AND COMPUTER PROGRAMS FOR COMMUNICATING MESSAGES WITH OTHER VEHICLES AND FOR ADAPTING A PHYSICAL LAYER CONFIGURATION

(71) Applicant: VOLKSWAGEN AKTIENGESELLSCHAFT, Wolfsburg (DE)

(72) Inventors: Ernst Zielinski, Bochum (DE); Steffen Schmitz, Wesel (DE)

(73) Assignee: Volkswagen Aktiengesellschaft

( * ) Notice: Subject to any disclaimer, the term of this patent is extended or adjusted under 35 U.S.C. 154(b) by 17 days.

(21) Appl. No.: 17/172,275

(22) Filed: Feb. 10, 2021

(65) Prior Publication Data
US 2021/0250740 A1    Aug. 12, 2021

(30) Foreign Application Priority Data
Feb. 11, 2020   (EP) .................................... 20156512

(51) Int. Cl.
| H04W 4/46 | (2018.01) |
| G08G 1/00 | (2006.01) |
| H04W 4/08 | (2009.01) |
| H04W 76/14 | (2018.01) |

(52) U.S. Cl.
CPC ............... H04W 4/46 (2018.02); G08G 1/22 (2013.01); H04W 4/08 (2013.01); H04W 76/14 (2018.02)

(58) Field of Classification Search
CPC ......... H04W 4/46; H04W 4/08; H04W 76/14; G08G 1/22
See application file for complete search history.

(56) References Cited

U.S. PATENT DOCUMENTS

| 2018/0227882 A1 | 8/2018 | Freda et al. |
| 2018/0279096 A1* | 9/2018 | Wu .................. H04W 4/08 |
| 2019/0036758 A1* | 1/2019 | Takeda ................ H04L 27/2666 |
| 2021/0029692 A1* | 1/2021 | Hui ....................... H04L 1/1825 |

(Continued)

FOREIGN PATENT DOCUMENTS

| EP | 3358898 A1 | 8/2018 |
| WO | 2016082700 A1 | 6/2016 |
| WO | 2018176059 A1 | 9/2018 |

OTHER PUBLICATIONS

3GPP TS 38.211; 3rd Generation Partnership Project; Technical Specification Group Radio Access Network; NR Physical channels and modulation; Release 16; Dec. 2019.

(Continued)

*Primary Examiner* — Ajay Cattungal
(74) *Attorney, Agent, or Firm* — Barnes & Thornburg, LLP (57) ABSTRACT

A transportation vehicle, a network entity, apparatuses, methods, and computer programs for communicating messages with other transportation vehicles and for adapting a physical layer configuration. The method for a transportation vehicle and for communicating messages with other transportation vehicles in a mobile communication system includes communicating broadcast messages using a first physical layer configuration of the mobile communication system and communicating non-broadcast messages using a second physical layer configuration of the mobile communication system.

23 Claims, 4 Drawing Sheets

(56) References Cited

U.S. PATENT DOCUMENTS

2021/0227365 A1* 7/2021 Vassilovski ............ H04B 17/27
2021/0282162 A1* 9/2021 Takeda .................. H04W 24/10
2021/0360504 A1* 11/2021 Zhang ................... H04W 40/22

OTHER PUBLICATIONS

Search Report for European Patent Application No. 20156512.4; dated Oct. 28, 2020.

* cited by examiner

VEHICLE, NETWORK ENTITY, APPARATUSES, METHODS, AND COMPUTER PROGRAMS FOR COMMUNICATING MESSAGES WITH OTHER VEHICLES AND FOR ADAPTING A PHYSICAL LAYER CONFIGURATION

PRIORITY CLAIM

This patent application claims priority to European Patent Application No. 20156512.4, filed 11 Feb. 2020, the disclosure of which is incorporated herein by reference in its entirety.

SUMMARY

Illustrative embodiments relate to a transportation vehicle, a network entity, apparatuses, methods, and computer programs for communicating messages with other transportation vehicles and for adapting a physical layer configuration, more particularly, but not exclusively, to a concept for using different physical layer configurations for communicating broadcast and non-broadcast messages in a wireless system.

BRIEF DESCRIPTION OF THE DRAWINGS

Disclosed embodiments will be described below with reference to the accompanying figures, in which.

DETAILED DESCRIPTION

Direct communication between mobile devices, also referred to as device-to-device (D2D), vehicle-to-vehicle (V2V), or car-to-car communication (C2C), has been a feature under development of newer generations of mobile communication systems. By enabling direct communication between transportation vehicles, message exchange can be enabled at low latencies. At the same time the data volume that is communicated between transportation vehicles is increasing. For example, sharing of sensor data between transportation vehicles may generate high loads.

Document WO 2018/176059 A1 describes methods, systems, and devices for wireless communication. A user equipment (UE), e.g., a lead platooning transportation vehicle configured for wireless communications, may determine a communication resource requirement for a group of platooning transportation vehicles. The communication resource requirement may be based at least in part on a number of transportation vehicles forming the group of platooning transportation vehicles and a communication range of at least a portion of the transportation vehicles. The UE may identify, based at least in part on the identified communication resource requirement, an assignment of time-frequency radio resources to use for inter-vehicle communications in the group of platooning transportation vehicles. The UE may transmit an indication of the assignment of time-frequency radio resources to the group of platooning transportation vehicles.

Document US 2018/0227882 A1 discloses a method, apparatus, and system of a User Equipment (UE) device executing communications using a Device-to-Device (D2D) Long Term Evolution (LTE) network. The method includes determining D2D devices communicating in an area, determining whether D2D data is to be transmitted, determining one or more resource sets for transmitting the D2D data, and transmitting the D2D data using the determined one or more resource sets.

Document EP 3 358 898 A1 relates to apparatuses, methods and computer programs for allocating transmission resources and for a mobile transceiver. An apparatus for a mobile transceiver of a mobile communication system comprises a transceiver module configured to receive control information from a base station transceiver of the mobile communication system and to communicate with another mobile transceiver of the mobile communication system. The apparatus further comprises a control module configured to control the transceiver module. The control module is further configured to receive information related to a first resource pool and information related to a second resource pool using the transceiver module. The control module is further configured to communicate with the other mobile transceiver using the transceiver module using a rateless code to encode data for transmission on resources of the second resource pool. Disclosed embodiments may alleviate the "half-duplex"-problem for direct communication.

There is a demand for an improved concept for inter-vehicle message communication.

This demand is addressed by the independent claims attached.

Disclosed embodiments are based on the finding that messages, which are communicated between transportation vehicles, may have different natures. For example, basic safety messages (BSM) may be communicated in a broadcast manner, i.e., they basically address all transportation vehicles in a certain surrounding area of a transmitter. Other messages, such as sensor sharing data messages may address only one transportation vehicle or a group of transportation vehicles and they might not be relevant for all transportation vehicles in a certain surrounding area of a transportation vehicle. Because of the different natures of these messages different physical layer configurations can be used which are tailored to the nature of the messages. For example, the sensor sharing data messages may address transportation vehicles in a group travelling together in a platoon. The relative velocities of these transportation vehicles among each other are expected to be smaller than those of transportation vehicles travelling other paths, e.g., in the opposite direction.

Disclosed embodiments provide a method for a transportation vehicle and for communicating messages with other transportation vehicles in a mobile communication system. The method comprises communicating broadcast messages using a first physical layer configuration of the mobile communication system. The method further comprises communicating non-broadcast messages using a second physical layer configuration of the mobile communication system. Using different physical layer configurations for broadcast and non-broadcast messages may increase the communication efficiency. The different physical layer configurations can be on one carrier or on multiple carriers. Disclosed embodiments may enable a mechanism for communicating non-broadcast messages that utilize common properties of the radio environment of the transportation vehicle the messages are communicated with.

For example, the first and second physical layer configurations may use different subcarrier spacings. The subcarrier spacing may determine a spectral efficiency and a Doppler robustness of the wireless communication. Tailoring the subcarrier spacing to the message nature may allow achieving a better tradeoff between Doppler robustness and spectral efficiency.

The first physical layer configuration may allow a more robust data transmission than the second physical layer configuration. Disclosed embodiments may enable robust message transmission for broadcast messages but a more spectral efficient and robust communication for non-broadcast messages. For example, known characteristics for non-broadcast messages, e.g., a lower Doppler shift, may be exploited to enable high spectral efficiency and robustness at the same time.

In some exemplary embodiments, the non-broadcast messages may comprise enhanced service messages, shared sensor data of the transportation vehicles or information related to remote driving of the transportation vehicles. Since the number of transportation vehicles addressed by such messages is lower than that for broadcast messages, the physical layer configuration can be tailored to a smaller group of recipients and therefore be made spectrally more efficient.

For example, the non-broadcast messages may comprise enhanced service messages or sensor data shared within a platoon of transportation vehicles. In a platoon of transportation vehicles, the transportation vehicles travel together and their relative velocities and therefore Doppler shifts among each other are lower than those relative on oncoming transportation vehicle. Therefore, a physical layer configuration for intra-platoon communication can be robust without having to consider large Doppler shifts, thereby the spectral efficiency can be increased, e.g., by using lower subcarrier spacing.

In some exemplary embodiments the broadcast messages are basic safety messages and the non-broadcast messages are enhanced service messages. Disclosed embodiments may enable tailoring the physical layer configurations to the natures of basic safety messages and enhanced service messages.

The non-broadcast messages may be communicated in a group of transportation vehicles having a common service and travelling a common route section. Common properties of transportation vehicles in a group may be exploited by exemplary embodiments.

Disclosed embodiments further provide a method for a network entity and for adapting a physical layer configuration for communicating non-broadcast messages among transportation vehicles in a mobile communication system. The method comprises initiating the communicating of the non-broadcast messages with an initial physical layer configuration with a first lower spectral efficiency. The method further comprises adapting the initial physical layer configuration towards a second higher spectral efficiency to obtain the second physical layer configuration. Disclosed embodiments may further enable adaptation of the physical layer configuration, which may further increase a communication efficiency.

The adapting of the initial physical layer configuration may be further based on one or more elements of the group of channel measurements, antenna capabilities, speed of the transportation vehicles, and a congestion situation of the mobile communication system. The physical layer configuration may hence be adapted to a current situation and the static properties of the communication participants.

In some exemplary embodiments the adaptation may comprise communicating information related to an adaptation of the physical layer configuration to the transportation vehicles. Disclosed embodiments may enable the adapting to be carried out in a decentralized manner by each transportation vehicle or in a centralized manner, e.g., by one transportation vehicle or a network component such as a base station or a server. The results may then be communicated among/to the participating transportation vehicles.

The adapting may be a continuous process and exemplary embodiments may enable a continuous physical layer adaption.

For example, the adapting may be based on multiple adaptation proposals from multiple transportation vehicles and a most robust proposal is used for the adapting. Disclosed embodiments may enable adaption in a way that a weakest transportation vehicle in a group is still able to properly receive the according messages.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Another exemplary embodiment is an apparatus for a transportation vehicle and for communicating messages with other transportation vehicles in a mobile communication system. The apparatus comprises one or more interfaces configured to communicate in the mobile communication system. The apparatus further comprises a control module, which is configured to control the one or more interfaces, wherein the control module is further configured to perform one of the methods described herein. A transportation vehicle comprising an exemplary embodiment of the apparatus is another disclosed embodiment.

Disclosed embodiments also provide an apparatus for a network entity and for adapting a physical layer configuration for communicating non-broadcast messages among transportation vehicles in a mobile communication system. The apparatus comprises one or more interfaces configured to communicate in the mobile communication system. The apparatus further comprises a control module, which is configured to control the one or more interfaces, wherein the control module is further configured to perform one of the methods described herein. A network entity, e.g., a transportation vehicle, a base station, or a server, comprising such an apparatus is another exemplary embodiment. A system comprising two or more of these components is also an exemplary embodiment.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
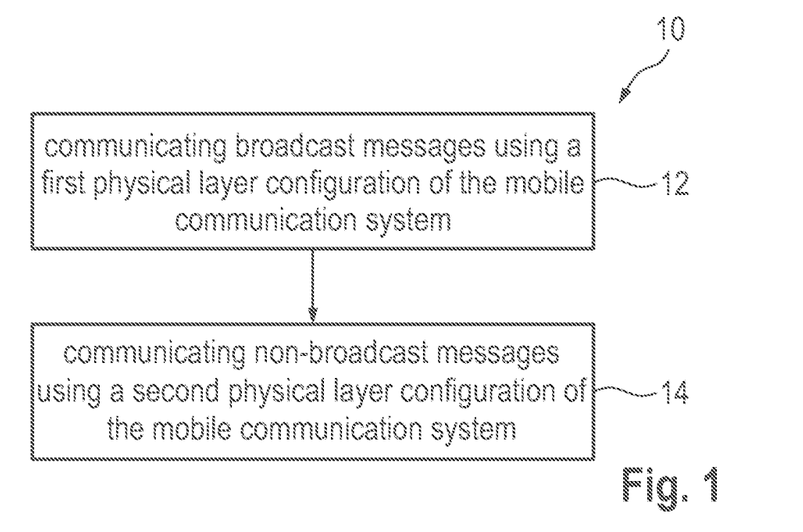
FIG. 1 illustrates a block diagram of an exemplary embodiment of a method for a transportation vehicle.

FIG. 1 illustrates a block diagram of an exemplary embodiment of a method 10 for a transportation vehicle. The method 10 allows for communicating messages with other transportation vehicles in a mobile communication system. The method comprises communicating 12 broadcast messages using a first physical layer configuration of the mobile communication system and communicating 14 non-broadcast messages using a second physical layer configuration of the mobile communication system.

In exemplary embodiments the physical layer configuration may comprise one or more elements of the group of a time division duplex scheme, a frequency division duplex scheme, a code division duplex scheme, a spatial division duplex scheme, and an orthogonal frequency division multiplexing scheme. The physical layer configuration may comprise at least an orthogonal frequency division multiplexing (OFDM) component. For example, the physical layer configuration may comprise information on a subcarrier bandwidth configuration for the orthogonal frequency division multiplexing component. Such a configuration may involve the indication or configuration of further parameters, for example, symbol duration, cyclic prefix duration, time transmission interval (TTI) length, subcarrier spacing, etc. The physical layer data channel configuration may comprise information on a numerology defined for the mobile communication system.

For example, the 3rd Generation Partnership Project (3GPP) defined in their technical specification TS 38.211 V15.1.0 in table 4.2.1 supported transmission numerologies. Multiple OFDM numerologies are supported as given by Table 4.2-1 of TS 38.211. As can be seen, different options for the subcarrier bandwidth are available based on parameter $\mu$. As the further sections in the same TS indicate $\mu$ also determines multiple further physical layer parameters, such as the number of OFDM symbols per slot, the number of slots per frame and subframe for normal cyclic prefix and alternatively for extended cyclic prefix. In some exemplary embodiments the first and second physical layer configurations use different subcarrier spacings/numerologies. For example, physical layer configuration may be configured by radio resource control (RRC) messages, which can be found in TS 38.331 in case of 3GPP 5G/NR system.

For example, a determining factor for service quality and robustness/stability in wireless communication using OFDM may be the subcarrier spacing (SCS). Examples can be found in the 3GPP specifications and/or in car-to-car (C2C) in IEEE (Institute of Electrical and Electronics Engineers) 802.11p. With increasing SCS the robustness (or stability) of a wireless link increases with respect to moving transceivers/vehicles (higher Doppler/velocity tolerance). The increased stability, however, comes at a price of a reduced spectral efficiency since the spectral spacing between the subcarriers cannot be used for data transmission anymore but serves as guard band to compensate potential Doppler shifts. The reduced spectral efficiency (decreased data rate) may also evoke a decreased service quality. However, although a low SCS may be desired with respect to spectral efficiency it may lead to increased packet loss and decreased service quality in high speed/Doppler scenarios. Disclosed embodiments may use different configurations for broadcast and non-broadcast messages. At least for the non-broadcast messages an adaptive physical layer configuration may be used. For example, in 3GPP systems an SCS may be configured to a low but robust (conservative) value.

Figure 2:
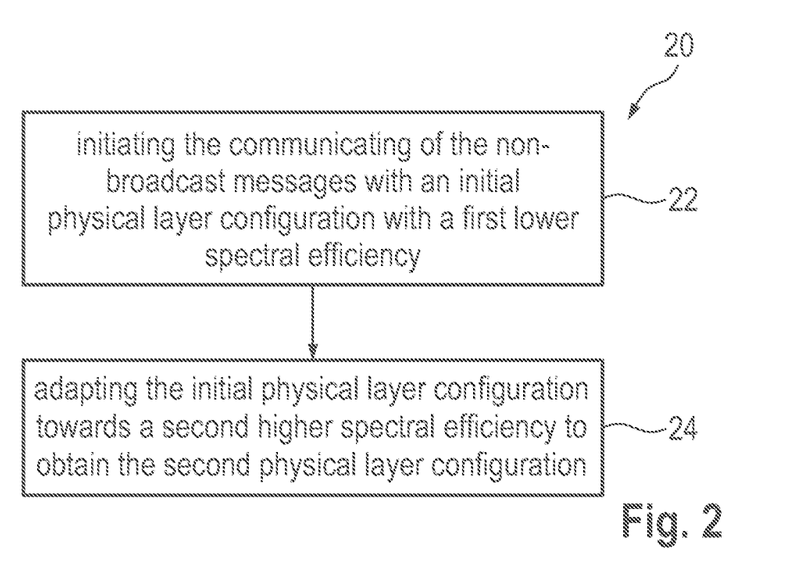
FIG. 2 illustrates a block diagram of an exemplary embodiment of a method for a network entity.

FIG. 2 illustrates a block diagram of an exemplary embodiment of a method 20 for a network entity. The method 20 for the network entity and for adapting a physical layer configuration for communicating non-broadcast messages among transportation vehicles in a mobile communication system comprises initiating 22 the communicating of the non-broadcast messages with an initial physical layer configuration with a first lower spectral efficiency and adapting 24 the initial physical layer configuration towards a second higher spectral efficiency to obtain the second physical layer configuration. In exemplary embodiments a first robust configuration may be adapted from a lower to a higher spectral efficiency. This may be achieved because the radio environment for non-broadcast messages may be more predictable than for broadcast messages as will be laid out in more detail in the sequel.

Figure 3:
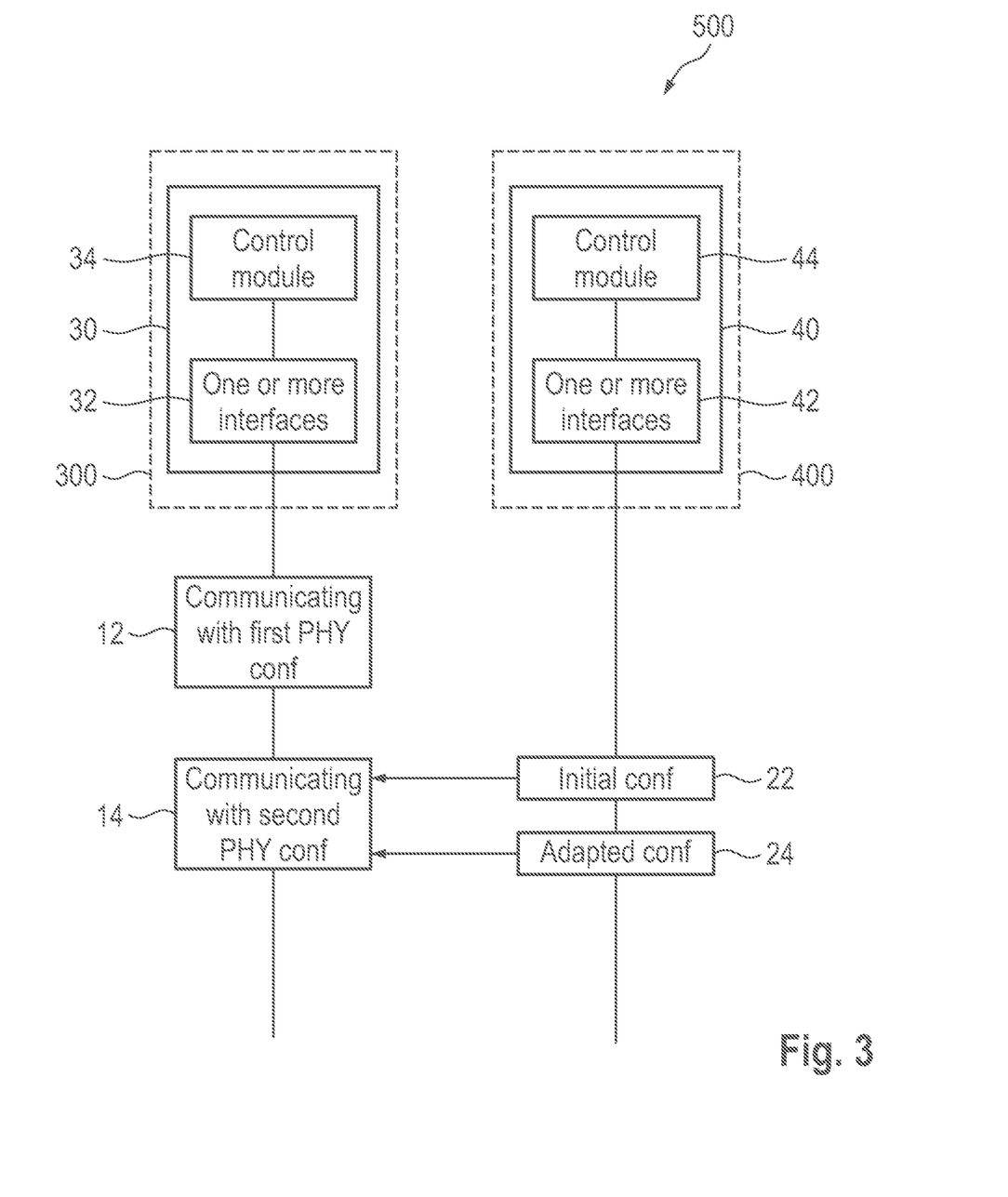
FIG. 3 illustrates block diagrams of exemplary embodiments of an apparatus for a transportation vehicle, an apparatus for a network entity, and a system.

FIG. 3 illustrates block diagrams of exemplary embodiments of an apparatus 30 for a transportation vehicle 300 and an apparatus 40 for a network entity 400. FIG. 3 further shows an exemplary embodiment of a transportation vehicle 300 (shown in dotted lines as optional from the perspective of the apparatus 30) comprising an exemplary embodiment of the apparatus 30. An exemplary embodiment of a network entity 400 (shown in dotted lines as optional from the perspective of the apparatus 40) comprising an exemplary embodiment of the apparatus 40 is also shown in FIG. 3. Yet another exemplary embodiment is a system 500 comprising at least an exemplary embodiment of a transportation vehicle 300 and a network entity 400.

In FIG. 3 the apparatus 30 for the transportation vehicle 300 is configured to communicate messages with other transportation vehicles in the mobile communication system 500. The apparatus 30 comprises one or more interfaces 32, which are configured to communicate in the mobile communication system 500. The apparatus 30 further comprises a control module 34, which is coupled to the one or more interfaces 32. The control module 34 is configured to control the one or more interfaces 32 and to perform one of the methods 10 described herein. This is shown by the two method operations at 12 and 14 in the sequence chart underneath the apparatus 30 in FIG. 3. The apparatus 30 is configured to communicate broadcast messages using a first physical layer configuration and to communicate non-broadcast messages using a second physical layer configuration.

FIG. 3 further illustrates an exemplary embodiment of an apparatus 40 for a network entity 400. The apparatus 40 is configured to adapt the physical layer configuration for communicating non-broadcast messages among transportation vehicles 300 in the mobile communication system 500. The apparatus 40 comprises one or more interfaces 42, which are configured to communicate in the mobile communication system 500. The apparatus 40 further comprises a control module 44, which is coupled to the one or more interfaces 42. The control module 44 is configured to control the one or more interfaces 42 and to perform one of the methods 20 as described herein. This is indicated by the two method operations at 22 and 24 in the sequence chart underneath the apparatus 40 in FIG. 3. The communication of the non-broadcast messages is initiated 22 with an initial physical layer configuration with a first lower spectral efficiency and then adapted 24 towards a second higher spectral efficiency to obtain the second physical layer configuration.

For example, non-broadcast messages may be unicast messages, group-cast messages or multicast messages. Unicast messages are message addressed to a single recipient. Multicast messages are messages addressed to multiple recipients, where the multiple recipients may be determined by subscription to a certain multicast service, for example. Group-cast messages are messages communicated to group members. For example, a platoon is a group of transportation vehicles travelling together.

In exemplary embodiments, the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to capabilities, control information, payload information, application requirements, trigger indications, requests, messages, data packets, acknowledgement packets/messages, etc.

As shown in FIG. 3 the one or more interfaces 32, 42 are coupled to the respective control modules 34, 44 at the apparatuses 30, 40. In exemplary embodiments the control module 34, 44 may be implemented using one or more processing units, one or more processing devices, any method or mechanism for processing, such as a processor, a computer or a programmable hardware component being operable with accordingly adapted software. In other words, the described functions of the control modules 34, 44 may as well be implemented in software, which is then executed on one or more programmable hardware components. Such hardware components may comprise a general purpose processor, a Digital Signal Processor (DSP), a micro-controller, etc.

In exemplary embodiments, communication, i.e., transmission, reception or both, may take place among transportation vehicles directly and/or between mobile transceivers/transportation vehicles and a network component/entity (infrastructure or mobile transceiver, e.g., a base station, a network server, a backend server, etc.). Such communication may make use of the mobile communication system 500. Such communication may be carried out directly, e.g., by device-to-device (D2D) communication, which may also comprise vehicle-to-vehicle (V2V) or car-to-car (C2C) communication in case of transportation vehicles, and which may be carried out using the specifications of a mobile communication system 500.

In exemplary embodiments the one or more interfaces 32, 42 can be configured to wirelessly communicate in the mobile communication system 500. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct cellular vehicle-to-anything (C-V2X), where V2X includes at least V2V, V2-Infrastructure (V2I), V2-Pedestrian (V2P), etc., transmission according to 3GPP Release 14 onward can be managed by infrastructure (so-called mode 3 in LTE) or run in a UE (so-called mode 4 in LTE).

The mobile communication system 500, as shown in FIG. 3, may, for example, correspond to one of the Third Generation Partnership Project (3GPP)—standardized mobile communication networks, where the term mobile communication system is used synonymously to mobile communication network. The mobile or wireless communication system 500 may correspond to a mobile communication system of the 5th Generation (5G, or New Radio (NR)) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, exemplary embodiments may provide a mobile communication system 500 comprising two or more mobile transceivers/vehicles and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)—stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver/vehicle can be associated with a network component, a base station transceiver or a cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following, a cell may represent an according base station transceiver generating the cell or, likewise, a base station transceiver may represent a cell the base station transceiver generates.

UEs/Vehicles may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, dedicated short range communication (DSRC), respectively. Technologies enabling such D2D-communication include 802.11p and beyond, 3GPP system (4G, 5G, NR and beyond), etc. For example, the two UEs are two transportation vehicles which share a certain section of their route. Accordingly, they would like to exchange certain messages, for example, Cooperative Awareness Messages (CAM) or Decentralized Environment Notification Messages (DENM), etc. For example, certain broadcast signals may be detected such that the transportation vehicles may become aware of each other. At some point, they would like to directly communicate with each other, e.g., to form a cluster or platoon or any other purpose. Messages that are communicated within such a cluster or group are then referred to as non-broadcast messages herein.

Broadcast messages are potentially addressed to all recipients. Therefore, a robust transmission is necessary to enable reception of such a message for as many recipients as possible. When addressing as many recipients as possible radio conditions are mostly unknown or unpredictable. For example, there may be radio channels with high path loss, high Doppler shifts, high delay spreads, high interference etc. Therefore, the transmission mode or physical layer configuration is chosen in robust manner, i.e., high SCS, robust modulation and potentially high redundancy and error robustness in channel coding. For non-broadcast messages radio conditions can be more determined. For example, in a unicast scenario channel estimation can be used to estimate the radio channel and the transmission mode or physical layer configuration can be adapted/tailored to the measured radio channel.

For multicast or groupcast messages at least some assumptions on the radio conditions may be suitable. For example, in a platoon of transportation vehicles it can be assumed that the transportation vehicles of the platoon travel at approximately the same velocity and in the same direction. Therefore, expected Doppler shifts are rather low as compared to the broadcast case in which oncoming transportation vehicles would experience high Doppler shifts. In some exemplary embodiments the non-broadcast messages are communicated in a group of transportation vehicles having a common service and travelling a common route section.

In exemplary embodiments the first physical layer configuration used for the broadcast messages allows a more robust data transmission than the second physical layer configuration. For example, the non-broadcast messages may comprise enhanced service messages, shared sensor data of the transportation vehicles or information related to remote driving of the transportation vehicles. Shared sensor data or information related to remote driving (e.g., a cluster head/global platooning controller of a platoon controlling the platoon members) may generated high data volumes.

Such data may be transmitted at a higher spectral efficiency exploiting known radio environment properties of the platoon. Hence, at least in some exemplary embodiments the non-broadcast messages comprise sensor data shared within a platoon of transportation vehicles. For example, the sensor data may comprise video, radar or lidar (light detection and ranging) data. The broadcast messages may be basic safety messages and the non-broadcast messages may be enhanced service messages. Enhanced service messages may comprise service announcements, e.g., a certain transportation vehicle offers certain functionalities or services, or messages that relate to these services or functionalities. Such communication may be periodic or non-periodic, and it may be an enabler for specific functions. Another example of an enhanced service may be communication of interpreted sensor information, e.g., with a description of an object or a proposed maneuver based on perceived changes in the environment.

Some exemplary embodiments relate to 3GPP 5G NR V2X, which offers different numerologies (carrier spacing parameters). Carrier spacing may be critical as it depends on the speed of transmitting (Tx) and/or receiving (Rx) vehicular UE (vUE) as well as a reflector of the transmitted signal between Tx and Rx vUE.

The inter-carrier interference increases with increasing speed/dynamic of the transmission path characteristics, e.g., because of Doppler shifts. Inter-carrier interference may reduce the spectral efficiency (Bits per sec per Hz) and therefore the data rate and it may have indirect impact on the latency. For vehicular applications, high reliability of the communication link is ensured for large carrier spacing.

Unfortunately, the increment of the carrier spacing may reduce the spectral efficiency. 5G NR offers a communication solution especially for high data rate services as sensor sharing, remote driving, etc. These services (enhanced services) may comprise safety critical services and high data rate services. Therefore, they may require high spectral efficiency combined with reliability. For an efficient communication system an adaptation of the numerologies may be required to provide the best reliability combined with the best achievable spectral efficiency. Disclosed embodiments may enable adaptive sub-carrier spacing adjusted communication (ASCSAC). For example, an adaptation of the SCS for multicast and groupcast communication/messages may be carried out.

Figure 4:
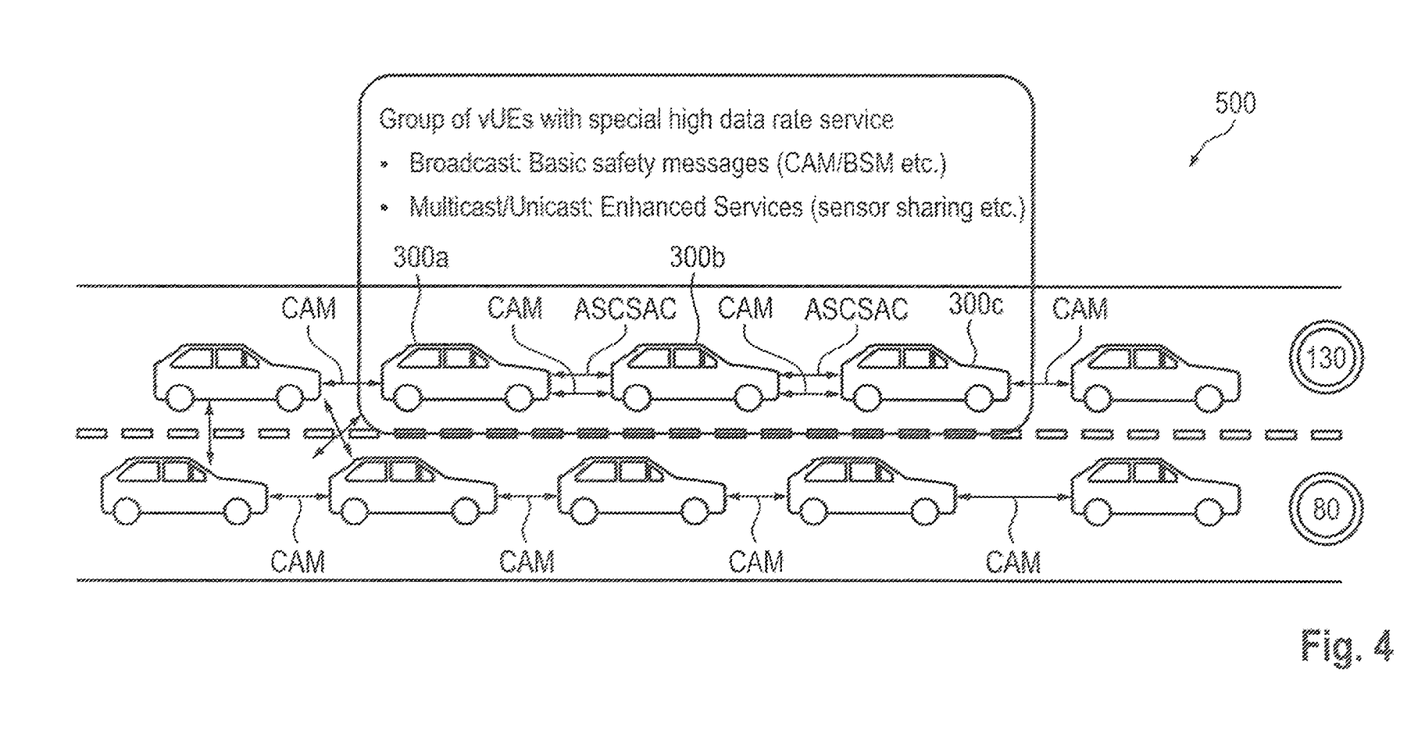
FIG. 4 depicts a scenario with adaptive subcarrier spacing adaptation in an exemplary embodiment.

FIG. 4 depicts a scenario with adaptive subcarrier spacing adaptation in an exemplary embodiment. It is to be noted that the broadcast messages are communicated to all transportation vehicles, i.e., those travelling in the same and those travelling in the opposite direction. This is indicated by the crossed arrows on the left of FIG. 4, which were omitted at the other transportation vehicles for a better overview. In FIG. 4 a road scenario is shown with a plurality of transportation vehicles. Three transportation vehicles 300a, 300b, and 300c form a group or platoon of vUEs with special high data rate service. As shown in FIG. 4 there are cooperative awareness messages (CAM), which are exchanged among all transportation vehicles. The CAM represent general broadcast messages in this exemplary embodiment. Other broadcast messages could be communicated alternatively or additionally. These are broadcast basic safety messages (CAM/BSM etc.). Within the group 300a, 300b, and 300c further non-broadcast messages are exchanged. These messages are multicast/unicast messages, which relate to enhanced/special services used within the group (e.g., sensor sharing, remote operating etc.). CAM should be detected by every vUE (full range of specified speeds are required). FIG. 4 shows an upper lane with a speed limit of 130 km/h and a lower lane with a speed limit of 80 km/h. For the broadcast messages the speed difference of 50 km/h and the corresponding Doppler shifts need to be considered.

ASCSAC may be only detected by vUEs, which use the same service via unicast or multicast messages and hence only group-based speeds are relevant. As the transportation vehicles 300a, 300b, and 300c travel together in the same lane the relative speeds are close to or equal to zero. Therefore, a lower SCS can be used. In exemplary embodiments the carrier spacing may be adapted dependent on the situation and the capabilities of the involved vUEs in the multicast/unicast communication.

Figure 5:
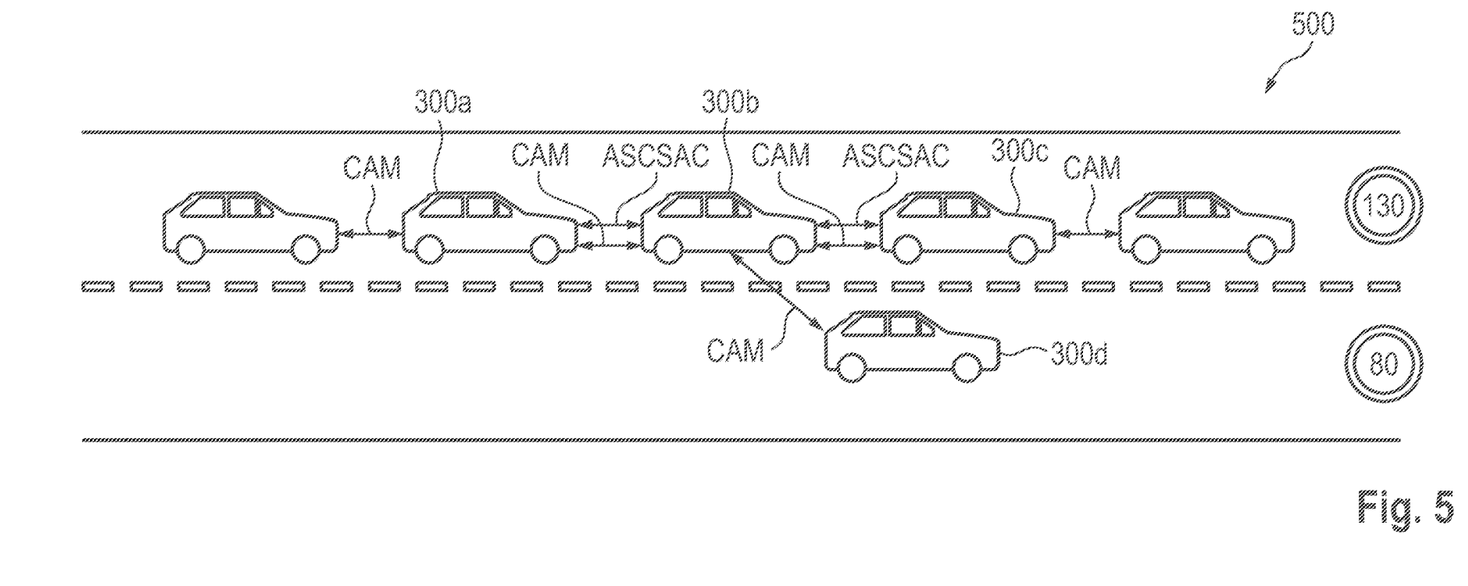
FIG. 5 depicts another scenario with subcarrier spacing adaptation in an exemplary embodiment.

FIG. 5 depicts another scenario with subcarrier spacing adaptation in an exemplary embodiment. FIG. 5 depicts a road scenario with a plurality of transportation vehicles on a two-lane road. The speed limit for the top lane is 130 km/h and the speed limit for the lower lane is 80 km/h. Transportation vehicles 300a, 300b, and 300c form a group and communicate non-broadcast ASCSAC messages and broadcast CAM messages, e.g., with transportation vehicle 300d travelling in the other lane.

In this exemplary embodiment the method 20 is carried out to adapt the SCS. After identification of the group vUEs 300a, 300b, and 300c, the carrier spacing can be negotiated by starting with the initial (reliable/robust) carrier spacing. Used parameter to support this process might be channel measurements and antenna capabilities (3GPP based parameters) as well as speed and congestion situation (non-3GPP parameters). In other words, in exemplary embodiments the adapting 24 of the initial physical layer configuration can be further based on one or more elements of the group of channel measurements, antenna capabilities, speed of the transportation vehicles, and a congestion situation of the mobile communication system.

This process can be realized autonomously or controlled by a "cluster head" (vehicle of the group) or another network entity. The network entity 400 at which the apparatus 40 is located and at which the method 20 is carried out may hence be another transportation vehicle, a group leader or cluster head, an infrastructure component of the mobile communication system 500, e.g., a base station, or a server somewhere else communicating with the transportation vehicles 300a, 300b, and 300c via the mobile communication system 500. In some exemplary embodiments the adapting 24 comprises communicating information related to an adaptation of the physical layer configuration to the transportation vehicles. As this situation is dynamic, the adaption process may be performed continuously. The adapting 24 may be a continuous process. In an exemplary embodiment with a decentralized implementation of the method 20 the adapting 24 may be based on multiple adaptation proposals from multiple transportation vehicles and a most robust proposal may be used for the adapting.

An exemplary embodiment of the method 20 may be summarized with the following sequence of method operations:

1. Initial grouping
2. Negotiation phase
   1. Reference signal analysis
      1. Doppler spread and SINR
      2. Optional: Classification of the Doppler spread (e.g., high/low)

2. Sub-Carrier Spacing Decision
   1. Option 1: Autonomously done (larges SCS wins) or
   2. Option 2: Centrally done (by cluster head/master))
   3. Messaging (Decision on Sub-Carrier Spacing)
3. Adaption phase (SCS for communication between group members will be adjusted)
4. Active phase (Communication of group messages)
5. Fine-tracking phase
   1. Regular scans and if required then re-negotiation/re-adaption Re-negotiation and re-adaption (see FIG. 5)

The use of the second physical layer configuration of the mobile communication system may allow making a more efficient use of the radio resources available. This may lead to support of a higher number of links or messages as compared to having a single fixed physical layer configuration, e.g., a single fixed SCS being set to a reliable/robust value.

As already mentioned, in exemplary embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform methods described herein or (field) programmable logic arrays ((F)PLAs) or (field) programmable gate arrays ((F)PGAs), programmed to perform the above-described methods.

The description and drawings merely illustrate the principles of the disclosure. It will thus be appreciated that those skilled in the art will be able to devise various arrangements that, although not explicitly described or shown herein, embody the principles of the disclosure. Furthermore, all examples recited herein are principally intended expressly to be only for pedagogical purposes to aid the reader in understanding the principles of the disclosure and the concepts to furthering the art, and are to be construed as being without limitation to such specifically recited examples and conditions. Moreover, all statements herein reciting principles and exemplary embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other exemplary embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having a method or mechanism for performing each of the respective operations of these methods.

LIST OF REFERENCE SIGNS 10 method for a transportation vehicle
12 communicating broadcast messages using a first physical layer configuration of the mobile communication system
14 communicating non-broadcast messages using a second physical layer configuration of the mobile communication system
20 method for a network entity
22 initiating the communicating of the non-broadcast messages with an initial physical layer configuration with a first lower spectral efficiency
24 adapting the initial physical layer configuration towards a second higher spectral efficiency to obtain the second physical layer configuration
30 apparatus for user equipment
32 one or more interfaces
34 control module
40 apparatus for user equipment
42 one or more interfaces
44 control module
300 transportation vehicle
300a transportation vehicle
300b transportation vehicle
300c transportation vehicle 300d transportation vehicle
400 network entity
500 mobile communication system

The invention claimed is:

1. A transportation vehicle apparatus for communicating messages with other transportation vehicles in a mobile communication system, the apparatus comprising:
one or more interfaces configured to communicate in the mobile communication system; and
a control module configured to control the one or more interfaces, wherein the control module controls the one or more interfaces to:
in response to determining that a message is a broadcast message, communicate the broadcast message using a first physical layer configuration of the mobile communication system,
in response to determining that a message is a non-broadcast message, adapt a configuration of the physical layer to a second configuration, wherein a first spectral efficiency of the first configuration is less than a second spectral efficiency of the second configuration, and wherein to adapt includes communicate, to the other transportation vehicles, information related to adapting the configuration of the physical layer by decreasing a subcarrier spacing, and in response to receiving a plurality of adaptation proposals from the other transportation vehicles, compare corresponding robustness of the received adaptation proposals to identify one of the received adaptation proposals having a highest robustness and adapt the second configuration of the physical layer to correspond to the one of the received adaptation proposals, and
communicate the non-broadcast message to the other transportation vehicles using the second physical layer configuration of the mobile communication system.

2. The apparatus of claim 1, wherein the first physical layer configuration allows a more robust data transmission than the second physical layer configuration.

3. The apparatus of claim 1, wherein the non-broadcast messages comprise enhanced service messages, shared sensor data of the transportation vehicles or information related to remote driving of the transportation vehicles.

4. The apparatus of claim 1, wherein the non-broadcast messages comprise enhanced service messages or sensor data shared within a platoon of transportation vehicles.

5. The apparatus of claim 1, wherein the broadcast messages are basic safety messages and the non-broadcast messages are enhanced service messages.

6. The apparatus of claim 1, wherein the non-broadcast messages are communicated in a group of transportation vehicles having a common service and travelling a common route section.

7. A non-transitory computer readable medium including a computer program having a program code for performing operations of the control module of claim 1 to communicate messages between transportation vehicles in a mobile communication system when the computer program is executed on a computer, a processor, or a programmable hardware component.

8. A network entity apparatus for adapting a physical layer configuration for communicating non-broadcast messages among a plurality of transportation vehicles in a mobile communication system, the apparatus comprising:
one or more interfaces to communicate in the mobile communication system; and
a control module configured to control the one or more interfaces, wherein the control module controls the one or more interfaces to:
communicate broadcast messages using a first physical layer configuration of the mobile communication system; and
communicate non-broadcast messages using a second physical layer configuration of the mobile communication system.

9. The apparatus of claim 8, wherein the first physical layer configuration allows a more robust data transmission than the second physical layer configuration.

10. The apparatus of claim 8, wherein the non-broadcast messages comprise enhanced service messages, shared sensor data of the transportation vehicles or information related to remote driving of the transportation vehicles.

11. The apparatus of claim 8, wherein the non-broadcast messages comprise enhance service messages or sensor data shared within a platoon of transportation vehicles.

12. The apparatus of claim 8, wherein the broadcast messages are basic safety messages and the non-broadcast messages are enhanced service messages.

13. The apparatus of claim 8, wherein the non-broadcast messages are communicated in a group of transportation vehicles having a common service and travelling a common route section.

14. A non-transitory computer readable medium including a computer program having a program code for performing operations of the control module of claim 8 to communicate messages between transportation vehicles in a mobile communication system when the computer program is executed on a computer, a processor, or a programmable hardware component.

15. A method for a transportation vehicle and for communicating messages with other transportation vehicles in a mobile communication system, the method comprising:
in response to determining that a message is a broadcast message, communicating the broadcast message using a first physical layer configuration of the mobile communication system,
in response to determining that a message is a non-broadcast message, adapting a configuration of the physical layer to a second configuration, wherein a first spectral efficiency of the first configuration is less than a second spectral efficiency of the second configuration, and wherein adapting includes communicating, to the other transportation vehicles, information related to adapting the configuration of the physical layer by decreasing a subcarrier spacing, and in response to receiving a plurality of adaptation proposals from the other transportation vehicles, comparing corresponding robustness of the received adaptation proposals to identify one of the received adaptation proposals having a highest robustness and adapting the second configuration of the physical layer to correspond to the one of the received adaptation proposals; and
communicating non-broadcast messages using a second physical layer configuration of the mobile communication system.

16. The method of claim 15, wherein the first physical layer configuration allows a more robust data transmission than the second physical layer configuration.

17. The method of claim 15, wherein the non-broadcast messages comprise enhanced service messages, shared sensor data of the transportation vehicles or information related to remote driving of the transportation vehicles.

18. The method of claim 15, wherein the non-broadcast messages comprise enhance service messages or sensor data shared within a platoon of transportation vehicles.

19. The method of claim 15, wherein the broadcast messages are basic safety messages and the non-broadcast messages are enhanced service messages.

20. The method of claim 15, wherein the non-broadcast messages are communicated in a group of transportation vehicles having a common service and travelling a common route section.

21. A method for adapting, by a network entity, a configuration of a physical layer for communicating non-broadcast messages among a plurality of transportation vehicles in a mobile communication system, the method comprising:

initiating communicating the non-broadcast messages using a first configuration of the physical layer having a first spectral efficiency;

adapting the configuration of the physical layer to a second configuration having a second spectral efficiency, wherein the first spectral efficiency is less than the second spectral efficiency, and wherein adapting includes communicating, to the plurality of transportation vehicles, information related to adapting the configuration of the physical layer by decreasing a subcarrier spacing, and in response to receiving a plurality of adaptation proposals from the transportation vehicles, comparing corresponding robustness of the received adaptation proposals to identify one of the received adaptation proposals having a highest robustness and adapting the second configuration of the physical layer to correspond to the one of the received adaptation proposals; and communicating the non-broadcast messages among the plurality of transportation vehicles using the second configuration of the physical layer.

22. The method of claim 21, wherein the adapting of the initial physical layer configuration is further based on one or more elements of the group comprising channel measurements, antenna capabilities, speed of the transportation vehicles, and a congestion situation of the mobile communication system.

23. The method of claim 21, wherein the adapting is a continuous process.

* * * * *